(12) United States Patent
　　　Reiher

(10) Patent No.: US 8,873,727 B2
(45) Date of Patent: Oct. 28, 2014

(54) METHOD FOR DETERMINING A CORRECT INTERNATIONAL PHONE NUMBER OF A CONTACT

(71) Applicant: Tribair inc., Longueuil (CA)

(72) Inventor: Eric Reiher, Longueuil (CA)

(73) Assignee: Tribair Inc., Longueuil (CA)

( * ) Notice: Subject to any disclaimer, the term of this patent is extended or adjusted under 35 U.S.C. 154(b) by 35 days.

(21) Appl. No.: 13/708,199

(22) Filed: Dec. 7, 2012

(65) Prior Publication Data

US 2014/0161242 A1　　Jun. 12, 2014

(51) Int. Cl.
　　*H04M 3/42*　　　(2006.01)
　　*H04M 1/56*　　　(2006.01)
　　*H04M 15/06*　　(2006.01)
　　*H04M 1/00*　　　(2006.01)
　　*H04M 3/00*　　　(2006.01)
　　*H04W 24/00*　　(2009.01)

(52) U.S. Cl.
　　CPC ................................. *H04M 3/42229* (2013.01)
　　USPC ............ 379/201.01; 379/142.06; 379/355.08; 455/414.1; 455/414.2; 455/456.1

(58) Field of Classification Search
　　USPC ............. 379/201.01, 142.06, 355.05, 142.01, 379/355.08; 455/456.3, 456.1, 414.1, 414.2
　　See application file for complete search history.

(56) References Cited

U.S. PATENT DOCUMENTS

| | | | |
|---|---|---|---|
| 8,243,915 B1 * | 8/2012 | Albuquerque et al. | .. 379/355.05 |
| 8,483,716 B1 * | 7/2013 | Albuquerque et al. | .... 455/456.3 |
| 2011/0116613 A1 * | 5/2011 | Hlin | ......................... 379/142.06 |

* cited by examiner

*Primary Examiner* — Thjuan K Addy
(74) *Attorney, Agent, or Firm* — Benoît & Côté Inc.

(57) ABSTRACT

A system and method for determining a correct international telephone number for a contact, based on the location of the user, the optional location of the contact and a set of rules representing the formats used in the two locations. The location information may be entered by the user or identified using the number and the set of rules. Once the location information is identified, the interface may determine the correct number to dial using the set of rules to produce a correct international telephone number. The correct telephone number may then be associated with the contact so that the correct telephone number is dialed upon receiving a user input to call the contact.

20 Claims, 5 Drawing Sheets

| USER PROFILE INFORMATION ||
|---|---|
| User Name | John Smith |
| City | Montreal |
| Country | Canada |
| Mobile | 514 658 4844 |

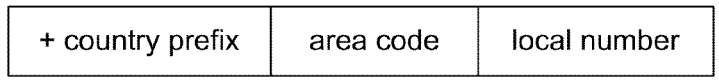
FIGURE 1a - PRIOR ART
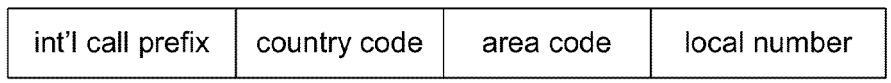
FIGURE 1b - PRIOR ART
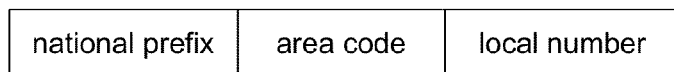
FIGURE 1c - PRIOR ART
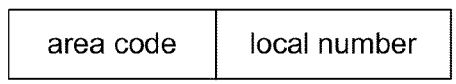
FIGURE 1d - PRIOR ART
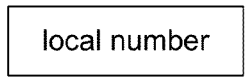
FIGURE 1e - PRIOR ART
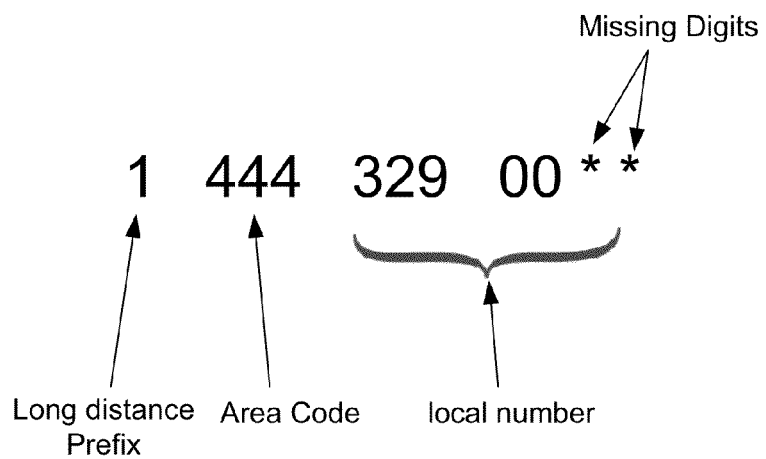
FIGURE 2 - PRIOR ART

| USER PROFILE INFORMATION ||
|---|---|
| User Name | John Smith |
| City | Montreal |
| Country | Canada |
| Mobile | 514 658 4844 |

METHOD FOR DETERMINING A CORRECT INTERNATIONAL PHONE NUMBER OF A CONTACT

BACKGROUND (a) Field

The subject matter disclosed generally relates to a method for determining a correct international phone number for a contact.

(b) Related Prior Art

It is a common practice by mobile phone users to quickly add contacts to their contact list/book without respecting or knowing the format in which the numbers should be entered and saved.

For example, a user in France (country code 33) might save the following number: +33144432900 in a variety of different ways including:
  a. 1 44 43 29 00
  b. 0 1 44 43 29 00
  c. 00 33 1 44 43 29 00
  d. 33 1 44 43 29 00
  e. +33 1 44 43 29 00

All of the above formats may be accepted and correctly dialed by local carriers in France. However, these formats are not all correctly dialed by international carriers. Most telephone networks today are interconnected in the international telephone network, where the format of international telephone numbers is standardized by ITU-T in the recommendation E.164. This specifies that the entire number should be 15 digits or shorter, and begin with a country prefix. For most countries, this is followed by an area code or city code and the subscriber number, which might consist of the code for a particular telephone exchange as shown in FIG. 1a. ITU-T recommendation E.123 describes how to represent an international telephone number in writing or print, starting with a plus sign ("+") and the country code. When calling an international number from a fixed line phone, the + must be replaced with the international call prefix chosen by the country the call is being made from as shown in FIG. 1b. Some mobile phones allow the + to be entered directly. When inside a country, users often dial local phone numbers using a national prefix first as shown in FIG. 1c. Finally, in some countries, users are allowed to dial a phone number starting directly with the area code as shown in FIG. 1d or by dialing only the local number as shown in FIG. 1e.

The prefix and codes shown in FIG. 1 differ between every country and so do the rules and formats of phone numbers. Some of the differences include:
1. different international call prefix. Some countries require 011, others 00 and others have yet different digits.
2. different national prefixes e.g. some countries require to add a zero before the area code when the number is in a different city within the same country, and other countries require to add 1 in the same case; some countries require the area code when the user is within the area code, and other countries do not;
3. different number of digits in the local number (usually ranging between a minimum and a maximum);
4. etc.

For example, even though the number: 1 44 43 29 00 is valid in France, when a user dials the same number from Canada or the USA the carrier returns an error message indicating that the number is incorrect or incomplete. This is due to the fact that the in Canada and the US, the number of digits in any phone number is ten (three for the area code and seven for the local number), and the digit 1 precedes the ten digits only when the number is a long distance number. In this case, a CA/US carrier may interpret the above number as a long distance number within CA/US and not as an international number to France. In which case an error message is returned indicating that the number is incomplete (local number is five digits instead of seven) as illustrated in FIG. 2.

There is therefore, a need for a method that determines the correct phone number of the contact before dialing it.

SUMMARY

The present embodiments offer such method.

According to an embodiment, there is provided a method for correcting a telephone number on a computing device used for making telephone calls, the method comprising:
  associating a home country to the computing device or to a user associated with the computing device;
  receiving a first telephone number on the computing device;
  identifying a first country that is hosting the first telephone number;
  automatically correcting the first telephone number using formatting rules for the home country and the first country, to generate a second telephone number; and
  returning the second telephone number for use instead of the first telephone number.

According to an aspect, identifying a first country is based on the first telephone number and a set of formatting rules for different countries, the identifying being an automatic process excluding the receipt of a user input.

According to an aspect, the method further comprises storing the formatting rules in the computing device.

According to an aspect, the method further comprises receiving updated formatting rules from a remote server over a telecommunication network.

According to an aspect, the first telephone number is associated with a contact on the computing device, the method further comprising saving the second telephone number in memory and associating the second telephone number with the contact so that the second telephone number is dialed upon receiving a user input to call the contact.

According to an aspect, the method further comprises displaying a button representing the first country and associating the button with the first telephone number and/or the second telephone number.

According to an aspect, the method further comprises receiving a user input replacing the first country with a second country, the method further comprising changing the second telephone number in accordance with the formatting rules of the second country.

According to an aspect, the identifying a first country and correcting the first telephone number are performed automatically upon receiving the first telephone number.

According to an aspect, the returning comprises saving the second telephone number in memory.

According to an aspect, the returning comprises dialing the first telephone number.

According to an aspect, associating the home country includes applying a set of formatting rules for different countries on a third telephone number associated with the computing device.

According to an embodiment, there is provided a computing device having access to a memory having recorded thereon statements and instructions which when executed cause the computing device to perform the steps of:

associating a home country for the computing device or for a user associated with the computing device;

receiving a first telephone number on the computing device;

identifying a first country that is hosting the first telephone number;

automatically correcting the first telephone number using formatting rules for the home country and the first country, to generate a second telephone number; and returning the second telephone number for use instead of the first telephone number.

According to an aspect, the computing device is one of: a server, a smart phone, a laptop, a desktop, a tablet, and a portable computing device.

According to an embodiment, there is provided a computer readable medium having recorded thereon statements and instructions which when executed on a computing device, cause the computing device to perform the steps of:

associating a home country for the computing device or for a user associated with the computing device;

receiving a first telephone number on the computing device;

identifying a first country that is hosting the first telephone number;

automatically correcting the first telephone number using formatting rules for the home country and the first country, to generate a second telephone number; and returning the second telephone number for use instead of the first telephone number.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 1a to 1e illustrates the possible sequences of digits dialed when making a call;

FIG. 2 illustrates how a carrier in Canada or the US may interpret a phone number for a contact in France;

FIG. 3a illustrates a user interface for entering information relating to the location of the user while FIG. 3b illustrates a user interface for entering information relating to a contact, in accordance with an embodiment;

It will be noted that throughout the appended drawings, like features are identified by like reference numerals.

DETAILED DESCRIPTION

Figures 3A, 3B:
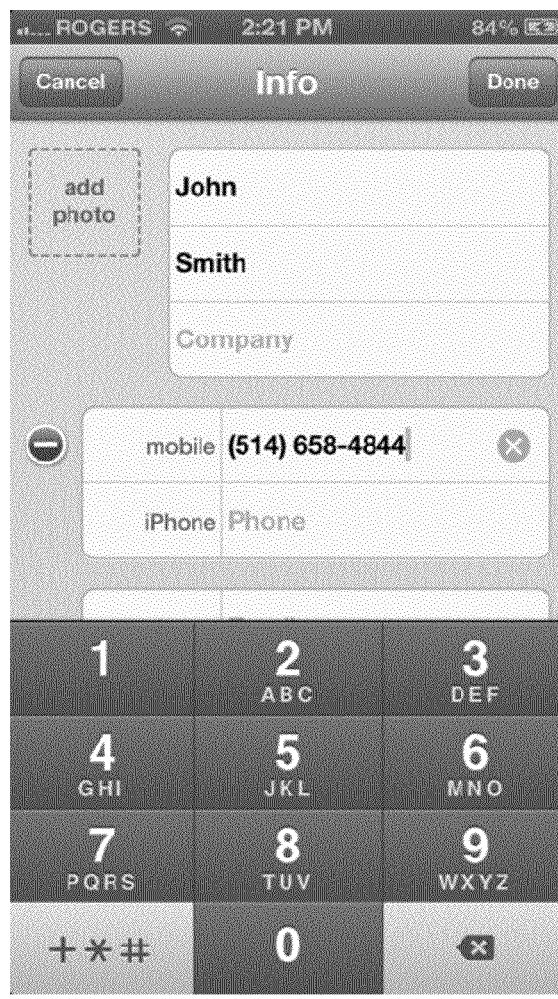

The embodiments now will be described more fully hereinafter with reference to the accompanying drawings, which form a part hereof, and which show, by way of illustration, specific embodiments by which the embodiments may be practiced. The embodiments are also described so that the disclosure conveys the scope of the invention to those skilled in the art. The embodiments may, however, be embodied in many different forms and should not be construed as limited to the embodiments set forth herein.

For example although the embodiments are described with reference to a mobile device, they may also be implemented on an IPOD, smart phones, laptops, desktops, tablets or any computing device having sufficient computing resources to implement the embodiments. Among other things, the present embodiments may be embodied as methods or devices (portable devices, servers, computer storage media, etc.). Accordingly, the embodiments may take the form of an entirely hardware embodiment, an entirely software embodiment, an embodiment combining software and hardware aspects, a user interface, etc.

Briefly stated, the embodiments are directed toward determining a correct phone number for a contact based on: 1) the location associated with the user (or portable phone of the user), 2) the location of the contact (the country hosting the contact and/or the phone number) and 3) a set of rules representing the formats used in each country.

In a non-limiting example of implementation, the method may be implemented in a user interface on a portable computing device used to make telephone calls over the internet (VOIP). Whereby, the user may download and installs an application, open an account and buy credits for making long distance/International/local calls.

It should be noted that in the current context, the location information of the user is not necessarily his actual physical location or of his mobile device at a given time (although it may be). Instead, the location information should be understood as being the home location (or home country) associated with the number/account of his user/mobile device. It specifies how the local numbers in his contact book are formatted. For example, a user who lives in Canada and/or has a number issued in Canada must specify Canada as being the location associated with their profile/account when installing the application on their portable device. Therefore, even if the user is in travel, the location information stored in their profile remains the same.

The user often has a large contact book, with contact's phone numbers entered in any valid format as illustrated in FIGS. 1a to 1d. The user doesn't need to change anything in his contact book or add any additional information.

Once the home location for the user is identified, the interface may determine the correct international number to dial to reach a specified contact using a set of formatting rules which define the correct format for each country. For example, the rules may include:

1. In user locations where dialing only an optional area code and local number is valid, then if the length of a phone number makes it a valid number, then it is assumed to be a call to the user's country and the user's country code and optionally his area code is added before the phone number;
2. If the phone number starts with the national prefix of the user's location, then the national prefix is replaced by the user's country code;
3. If the phone number starts with international call prefix of the user's location then the international call prefix is simply removed;
4. If the phone number starts with a valid country code, it is assumed to be correct;
5. If the phone number starts with a 0, the zero is removed because no valid country codes start with 0; and
6. In all cases, the resulting international phone number is displayed to the user with the associated county flag. If there is a mistake, the user can tap on the country flag to change the country code.

Identifying the Location Information of the User/Mobile Device

Identification of the location information of the user/mobile device may be done in a variety of ways.

In one embodiment, the interface may request the location information of the user/mobile device from the user as exemplified in FIG. 3a whereby the user may provide this information when installing the application or when opening an account to buy credits, etc.

In another embodiment, if the user does not provide the location information, the interface may detect this information using the telephone number associated with the mobile device and the set of rules. For example, if the telephone number associated with the mobile device is 1 514 658 4844, the interface may determine using a set of rules that this is number in Montreal-Canada.

Once identified, the location information of the user is saved in memory to perform the necessary formatting for the number prior to calling it.

Identifying the Location Information of the Contact

Identification of the location information of the contact may be done in a variety of ways.

In one embodiment, the user interface of the mobile device may be set to include the country and/or city of the contact as mandatory or non-mandatory fields when entering a new contact or even when updating an existing contact. An example is shown in FIG. 3b which illustrates a user interface including fields for entering the country and/or city of the contact when adding a new contact. The location information is stored in memory and used to determine the correct phone number of the contact by adding and/or removing the necessary digits (usually zeros or ones). In an embodiment, changes to the phone number of the new contact are automatically effected upon entering the new contact so that the call is directly placed using the correct information next time the contact is called.

In another embodiment, when the location information is not provided by the user, the interface may identify/determine/estimate the correct number of the contact by first estimating/determining/predicting the location of the contact from the phone number entered by the user.

A number of non-limiting examples of how the rules may be used to determine the location information of a contact are provided below. It should be noted that the rules may be applied in a similar manner to determine the location information of the user when the user does not provide this information.

In a first example, consider the case where a French user enters 01 44 43 29 00 as the number associated with a contact on their mobile device. In this case, the interface may conclude that the number is a number in France based on the number of digits and the fact that 0 is the national prefix. Accordingly, the interface may treat the call as an international call and add the country code before the prefix and perform the necessary formatting such as removing or adding the necessary digits or fields as dictated by the requirements/rules of the called country. In the present case, the interface may dial the following number instead of the first number: +33 1 44 43 29 00.

In another example, consider the case where a Canadian user enters 514 658 4844 as the number associated with a contact on their mobile device. In this case, the interface could conclude that the destination is Peru because 51 is Peru's country code and the length of the phone number is valid. But calling local numbers has priority over international numbers. Since this number is exactly 10 digits, the size of local numbers in Canada then it is assumed that the user is most likely wanting to call Canada. If the user wanted to call Peru, he could either add a + before the phone number or 011, Canada's international prefix. In this case the interface may save/dial the following number: +1 514 658 4844.

Figure 4:
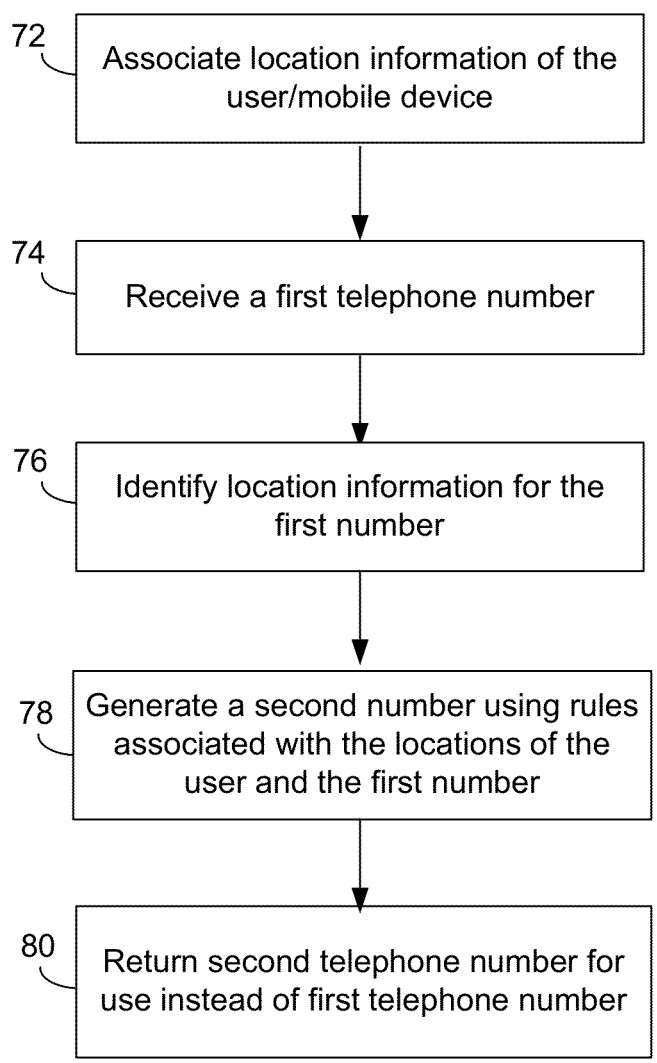
FIG. 4 is a flowchart of a method for correcting a phone number in accordance with an embodiment.

FIG. 4 is a flowchart of a method for correcting a phone number in accordance with an embodiment. The method 70 begins at step 72 by associating the location information of the user/mobile device. As discussed above, this information may be provided by the user or may be identified by the interface using the telephone number and a set of formatting rules that define the format in each country.

At step 74, a first telephone number is received. For example, the number may be entered by the user to be saved and associated with a contact and/or dialed immediately. At step 76, the interface identifies the location information of the first telephone number. As discussed above, this information may be provided by the user or may be identified by the interface using the telephone number and a set of formatting rules that define the format in each country.

At step 78, the interface corrects the first telephone number to produce a second telephone number, based on the location information of the user, the location information of the number/contact and the formatting rules associated with the two locations.

Step 80 comprises returning the second telephone number for use instead of the first telephone number. For example, the second telephone number may be stored in memory and associated with a certain contact or dialed instead of the first telephone number entered by the user.

In an embodiment, if the interface cannot accurately determine the country for the number/contact it may present one or more most probable suggestions for the user to select from.

In an embodiment, the interface may save the correct number (aka second number) in memory and associate it with the number entered by the user (aka first number) so that whenever the interface receives a user input including instructions to dial the first number, it would instead dial the second number (the correct number). In an embodiment, the second number may be stored in memory without being shown to the user. In another embodiment, the second number may replace the first number in the list of contacts. In another embodiment, the second number may be presented/suggested to the user to confirm/reject the suggestion. In a further embodiment, both the second number and the first number may be shown/illustrated in the interface whereby by pressing or selecting either of the two numbers the second number gets dialed.

Figure 5A:
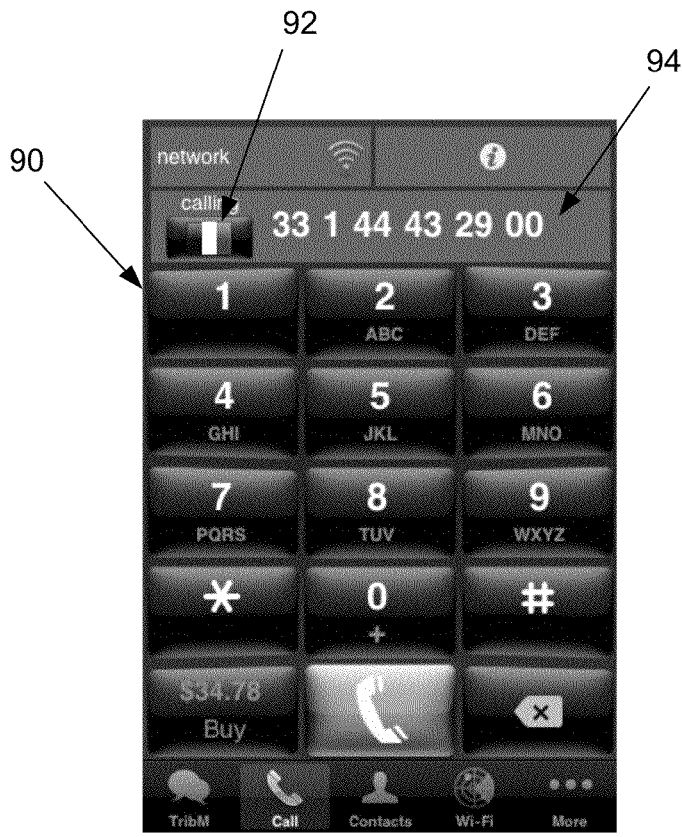
FIGS. 5a and 5b illustrate an embodiment of an interface where the user can modify the country of the dialed number.
Figure 5B:
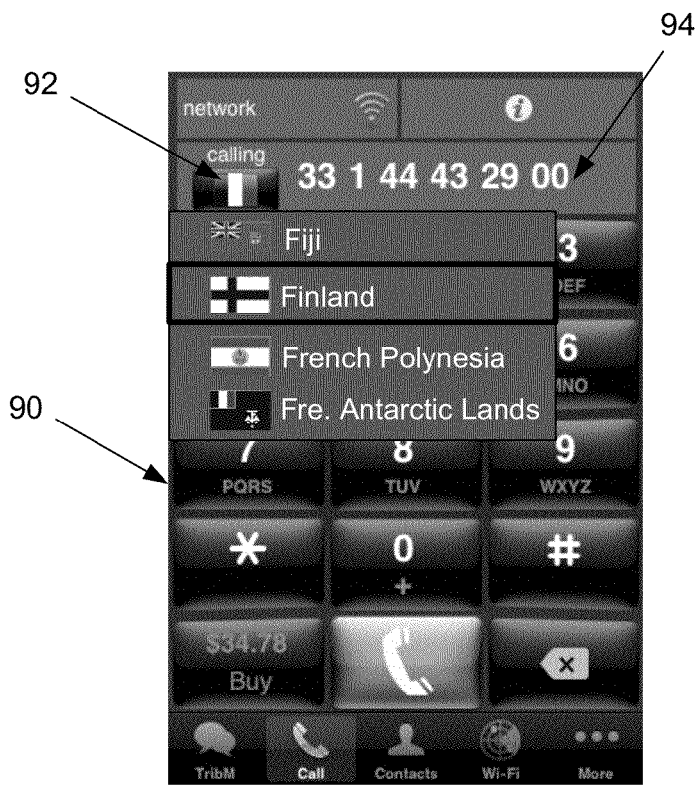

FIGS. 5a and 5b illustrate an embodiment of an interface where the user can modify the country of the dialed number, in a non-limiting implementation. In an embodiment, the interface 90 may present a button 92 next to the number 94, the button 92 representing the country associated with the number, e.g., a flag of that country as shown in FIG. 5a, whereby by pressing/selecting the button 92 the user may change the country from a drop down menu or a selection wheel or the like, as shown in FIG. 5b. Upon receiving the user selection of another country (aka a second country), the interface may re-format the correct number in accordance with the rules of the country selected by the user.

In an embodiment, the interface may automatically correct the number upon receiving it from the user irrespective of whether the user has provided the location information of the contact or not. As discussed above, the interface may identify the country of the number/contact based on the number itself and the set of rules for each country in real time and as the user is entering the number. The user may intervene to correct the location information as described in connection with FIGS. 5a and 5b. However, such intervention is optional as the correction process and location predicting processes may be performed without user intervention, and automatically upon receiving the number (when the number is typed/pressed/entered). In other words, when the user is entering the number, the interface would be identifying the country that hosts the received number so that next time the number is dialed the correct number would be dialed instead of the number entered by the user.

In an embodiment, the set of rules are preferably stored in memory and updated frequently. For instance, the mobile phone or computing device may receive updates from a central server over a wireless/wired link.

In another embodiment, the set of rules may also be stored in the central server, whereby the mobile device may send the phone number entered by the user to the central server to correct it, and receive back the correct number.

Illustrative Operating Environment

Embodiments of the invention may be implemented/operated using a client device. The client device may be in communication with a remote server via a communication network to perform VOIP calls.

Figure 6:
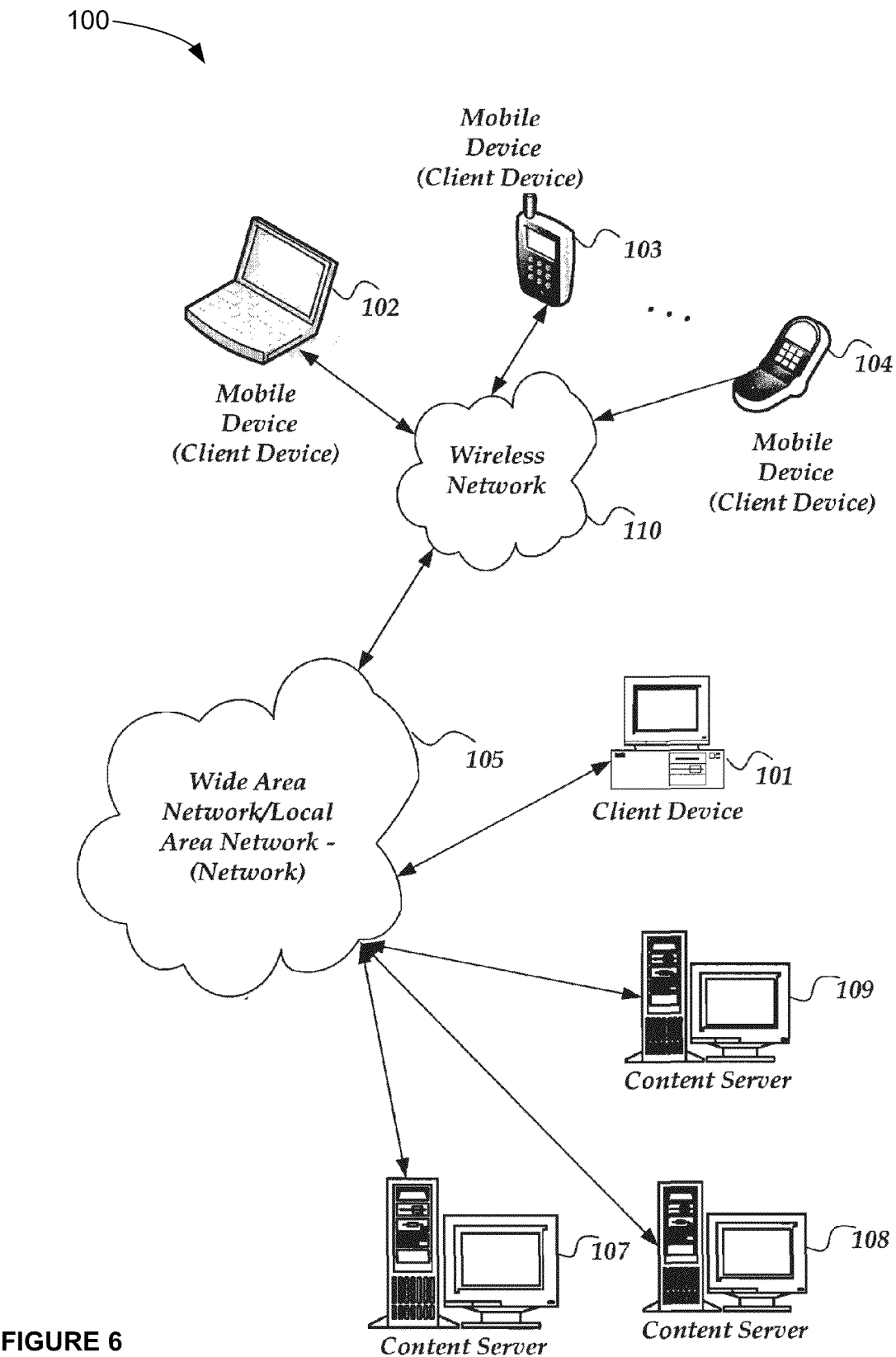
FIG. 6 illustrates components of one embodiment of an environment in which the embodiments may be practiced.

FIG. 6 shows components of one embodiment of an environment in which the embodiments may be practiced. Not all the components may be required to practice the embodiments, and variations in the arrangement and type of the components may be made without departing from the spirit or scope of the invention. As shown, system 100 of FIG. 6 includes local area networks ("LANs")/wide area networks ("WANs")—(network) 105, wireless network 110, mobile devices (client devices) 102-104, client device 101, and content servers 107-109. Local area networks ("LANs")/wide area networks ("WANs")—(network) 105 and wireless network 110 are both examples of telecommunications networks.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, a device of the IPOD or IPAD family of devices manufactured by Apple Computer, integrated devices combining one or more of the preceding devices, or any other computing device capable of performing the methods and systems described herein. Client device 101 may also include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, and several lines of color LCD display in which both text and graphics may be displayed. It should be understood, however, that the client device may also include one or more other physical user interface devices, such as a physical keyboard, a mouse etc.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

The client devices 101-104 may be adapted to connect with one or more of servers 107-109 to receive executable codes and programs (aka applications) and for updating some of the existing applications and content stored on the client devices 101-104.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, Wi-Fi network, or the like. Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple content servers 107-109, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Content servers 107-109 include virtually any network device that is configured to provide content over a network to another computing device.

In particular, content servers 107-109 may host a variety of social networking sites, including, but not limited to Flicker, Twitter, Facebook, LinkedIn, personal user sites, such as blogs, vlogs, online dating sites, and so forth. Content servers 107-109 may also host a variety of non-social networking sites, including, but not limited, to various business sites, educational sites, dictionary sites, encyclopedia type sites, financial sites, government sites, and the like. Content servers 107-109 may further provide a variety of services that include, but are not limited to web services, third-party services, audio services, video services, email services, IM services, SMS services, VOIP services, calendaring services, photo services, or the like. Content may include web content, audio content, video content, FTP data, or the like. Devices that may operate as content server 107 include personal computers desktop computers, multiprocessor systems, microprocessor-based or programmable consumer electronics, network PCs, servers, and the like.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for correcting a telephone number on a computing device used for making telephone calls, the method comprising:
   associating a home country to the computing device or to a user associated with the computing device;
   receiving a first telephone number on the computing device;
   identifying, using a set of formatting rules, a first country that is hosting the first telephone number as the user is typing/entering the first telephone number;
   automatically correcting the first telephone number using formatting rules for the home country and the first country, to generate a second telephone number; and
   returning the second telephone number for use instead of the first telephone number.

2. The method of claim 1, wherein identifying a first country is based only on the first telephone number and a set of formatting rules for different countries, the identifying being an automatic process excluding the receipt of a user input.

3. The method of claim 2, further comprising storing the formatting rules in the computing device.

4. The method of claim 3, forwarding the second number to a remote server via an internet network for dialing the second number as a Voice Over IP (VOIP) call.

5. The method of claim 1, wherein the first telephone number is associated with a contact on the computing device, the method further comprising saving the second telephone number in memory and associating the second telephone number with the contact so that the second telephone number is dialed upon receiving a user input to call the contact.

6. The method of claim 1, further comprising displaying a button representing the first country on a display of the computing device beside the first telephone number and/or the second telephone number.

7. The method of claim 6, further comprising receiving a user input replacing the first country with a second country, the method further comprising changing the second telephone number in accordance with the formatting rules of the second country.

8. The method of claim 1, wherein the identifying a first country and correcting the first telephone number are performed automatically upon receiving the first telephone number.

9. The method of claim 1, wherein the returning comprises saving the second telephone number in memory.

10. The method of claim 1, wherein the returning comprises dialing the first telephone number.

11. The method of claim 1, wherein associating the home country includes applying a set of formatting rules for different countries on a third telephone number associated with the computing device.

12. A computing device having access to a memory having recorded thereon statements and instructions which when executed cause the computing device to perform the steps of:
    associating a home country for the computing device or for a user associated with the computing device;
    receiving a first telephone number on the computing device;
    identifying, using a set of formatting rules, a first country that is hosting the first telephone number as the user is typing/entering the first telephone number;

automatically correcting the first telephone number using formatting rules for the home country and the first country, to generate a second telephone number; and returning the second telephone number for use instead of the first telephone number.

13. The computing device of claim 12, wherein the computing device is one of: a server, a smart phone, a laptop, a desktop, a tablet, and a portable computing device.

14. A computer readable memory having recorded thereon non-transitory statements and instructions which when executed on a computing device, cause the computing device to perform the steps of:

associating a home country for the computing device or for a user associated with the computing device;

receiving a first telephone number on the computing device;

identifying, using a set of formatting rules a first country that is hosting the first telephone number as the user is typing/entering the first telephone number;

automatically correcting the first telephone number using formatting rules for the home country and the first country, to generate a second telephone number; and returning the second telephone number for use instead of the first telephone number.

15. The computer readable memory of claim 14, wherein identifying a first country is based only on the first telephone number and a set of formatting rules for different countries, the identifying being an automatic process excluding the receipt of a user input.

16. The computer readable memory of claim 15, wherein the computing device is further configured to perform the step of storing the formatting rules in the computing device.

17. The computer readable memory of claim 15, wherein the computing device is further configured to perform the step of receiving updated formatting rules from a remote server over a telecommunication network.

18. The computer readable memory of claim 14, wherein the first telephone number is associated with a contact on the computing device, the computing device is further configured to perform the step of saving the second telephone number in memory and associating the second telephone number with the contact so that the second telephone number is dialed upon receiving a user input to call the contact.

19. The computer readable memory of claim 14, wherein the computing device is further configured to perform the step of displaying a button representing the first country beside the first telephone number and/or the second telephone number.

20. The computer readable memory of claim 19, wherein the computing device is further configured to perform the step of receiving a user input replacing the first country with a second country, the method further comprising changing the second telephone number in accordance with the formatting rules of the second country.

* * * * *